March 14, 1967     E. G. HEINRICH     3,309,474
RAINFALL ACTUATED SWITCHING APPARATUS
Filed Jan. 25, 1966
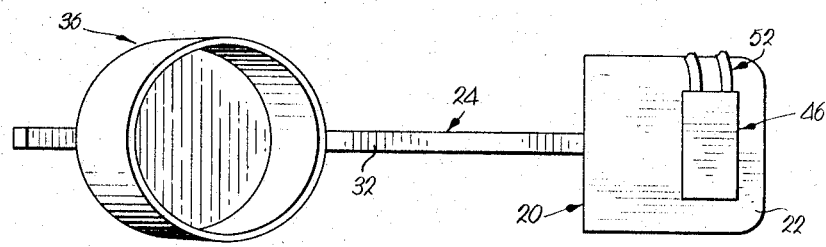
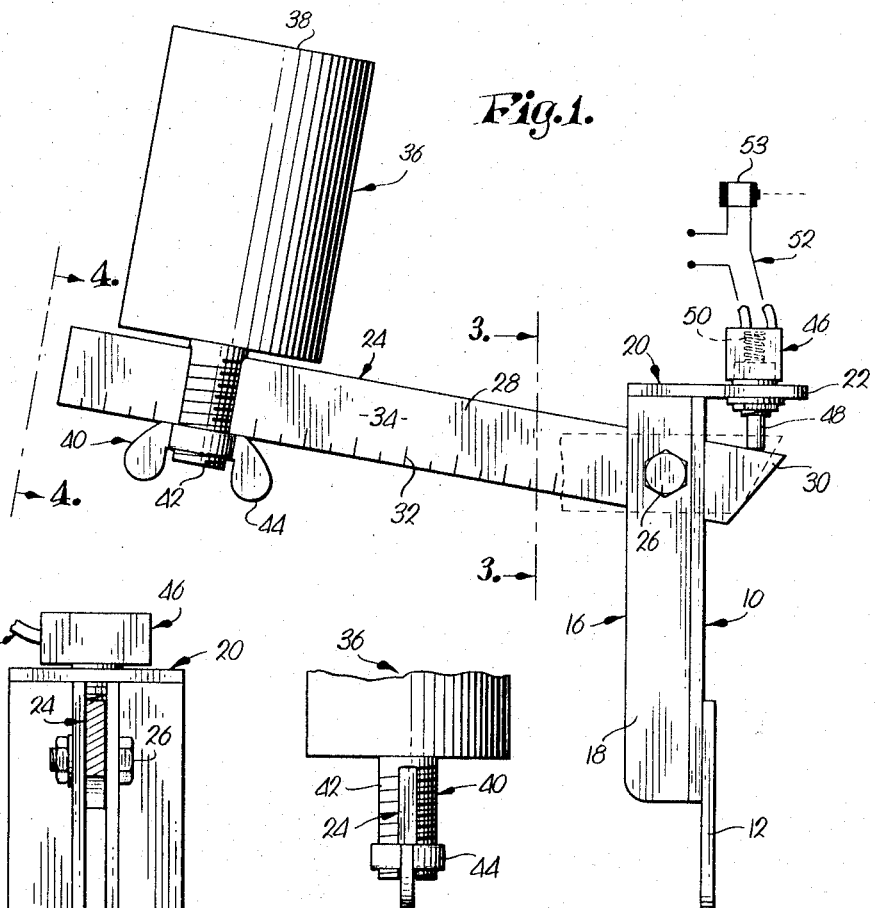
INVENTOR
Elmer G. Heinrich
BY 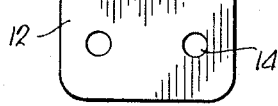
ATTORNEYS.

3,309,474
RAINFALL ACTUATED SWITCHING APPARATUS

Elmer G. Heinrich, Goodland, Kans., assignor of one-half to Selby S. Soward, Goodland, Kans.
Filed Jan. 25, 1966, Ser. No. 522,951
6 Claims. (Cl. 200—61.07)

This invention relates to switching apparatus actuated by rainfall and has as its primary object the provision of novel structure adapted to be coupled to an irrigation water supply for discontinuing water flow therefrom when a predetermined amount of rain has fallen.

Generally, irrigation is quite expensive and every effort must be utilized to avoid wasteful use of the limited water supply, particularly when there is sufficient rainfall to obviate the need for irrigation water. This is a particular problem during the sleeping hours as the irrigation farmer will not realize that it is raining and thus will not have the opportunity of turning off the water supply. Additionally, irrigation tracts are often widespread, some areas being quite remote from the water supply and the residence of the farmer, all to the end that relatively localized showers may be unknown to the farmer, resulting in excess and wasteful irrigation.

Accordingly, it is an important object of the instant invention to provide electrical switching apparatus responsive to rainfall, which apparatus is located in the field and responsive to rainfall occurring in the proximate area whereby the water flow from the particular irrigation pipe supplying the specific area will be discontinued through electrical circuit means when there has been a predetermined rainfall depth.

It is another object of the present invention to provide a rainfall actuated switching apparatus of the aforementioned character wherein is included structure for selectively varying the actuation point of the device to correspond to preselected depths of rainfall and thereby compensate for various types of crops which may have differing water volume requirements. Other characteristics such as different types of soil, drainage, or climate may also be accorded individual treatment by such selective structure.

Other objects include details of construction which will become apparent from the following specification and accompanying drawing, wherein:

FIGURE 1 is a side elevational view of a rainfall actuated switching apparatus made pursuant to the teachings of my invention and showing a schematic wiring diagram therefor;

FIG. 2 is a plan view thereof;

FIG. 3 is a fragmentary, cross-sectional view taken along line 3—3 of FIG. 1, with parts appearing in elevation; and FIG. 4 is a cross-sectional view taken along line 4—4 of FIG. 1.

In the present invention, a mounting bracket 10 is provided and includes a baseplate 12 having mounting apertures 14 formed therein. A pair of flanged members 16 are secured in spaced relationship to baseplate 12 and extend upwardly therefrom to present a pair of laterally extending spaced legs 18. A top plate 20 is secured to the uppermost edges of legs 18 and extends laterally therefrom to present a projection 22.

A lever member 24 is pivotally mounted intermediate its ends between legs 18 by nut and bolt means 26 to present first and second portions 28 and 30 on opposite sides of bolt 26. An index scale 32 is provided on the side surface 34 of lever 24 and adjacent the lower edge thereof.

A cup 36 having an open end 38 is secured to lever 24 by readily releasable structure broadly designated by the numeral 40. Structure 40 includes a slotted bolt 42 designed to straddle lever 24 and is secured thereto by a wing nut 44 threaded onto the end of the bolt. Cup 36 is rigidly secured to the upper face of bolt 42 to normally dispose open end 38 upwardly.

An normally open switch 46 is secured to projection 22 of top plate 20 and includes a push button 48 depending from projection 22, the button being yieldably biased downwardly by a balancing element in the form of a weight responsive coil spring 50. The lower extremity of button 48 engages the upper surface of second portion 30 of lever 24 whereby spring 50 is balanced against the effective weight of cup 36. Switch 46 is operably coupled to an electrically controlled irrigation water supply through circuitry means 52 and an electrically responsive actuating device 53 so that, when switch 46 is open, water will flow to the field, but when switch 46 is closed, water flow will be stopped by operation of device 53.

In operation, the structure of the present invention is placed in the field and mounted on any suitable support by bracket 10. Cup 36 is shifted to the desired position along the length of member 24 by loosening wing nut 44 and sliding bolt 42 along lever 24 until the desired depth of rainfall is indicated by the intersection of bolt 42 with index scale 32.

Before any rainfall has been received by cup 36, the latter will be held in the upper operating position shown in full lines in FIG. 1 by the biasing action of spring 50 operating through push button 48. When rain is received through open end 38 of cup 36, lever 24 will progressively shift or swing counterclockwise through a vertical plane against the resistance of spring 50. Cup 36 continues to swing downwardly in response to the weight of rain accumulating in the cup 36 until the latter reaches a lower operating position corresponding to the lever position indicated fragmentarily by dashed lines in FIG. 1. At this point, second portion 30 of lever 24 has swung upwardly to depress push button 48 a sufficient distance to close switch 46 and its associated circuit 52, whereupon the electrically controlled device 53 is operated to interrupt the irrigation supply to stop the flow of water to the field where the switching apparatus is located.

Thus, irrigation water flow is automatically stopped at the predetermined depth of rainfall indicated by scale 32 in cooperation with bolt 42, thereby eliminating excess and wasteful use of the water supply. It will be appreciated that cup 36 may be shifted along the length of member 24 to vary the rain water depth necessary to close switch 46 and, therefore, compensate for individual conditions of the field, such as soil, drainage and the particular crop being irrigated. It will also be recognized that suitable appropriate circuitry could be utilized wherein switch 46 would be normally closed for energizing water pumping apparatus or the like through circuit 52. Operation of switch 46 through accumulation of sufficient water in cup 36 would, in that event, obviously open the electrical circuit to interrupt the flow of irrigation water. Further, it will be apparent to those skilled in the art that the apparatus of this invention may have a variety of uses and need not be limited to irrigation purposes.

Having thus described the invention, what is claimed as new and desired to be secured by Letters Patent is:

1. A rainfall-actuated switching apparatus comprising:
   a bracket;
   a lever;
   means pivotally mounting said lever on said bracket for swinging of the lever through a vertical plane;
   a cup;
   readily releasable structure securing said cup to the lever at any one of a number of positions along the length of said lever, each of said positions corresponding to a selective depth of rainfall, the open end of the cup normally being disposed upwardly;

a balancing element connected to said lever to normally yieldably dispose the cup in an upper operating position; and a switch positioned adjacent said lever and actuated thereby when the lever and cup are pivoted against the resistance of said balancing element from the cup's upper operating position to a predetermined lower operating position in response to the weight of rain falling into said cup.

2. The invention of claim 1, there being a scale on said lever cooperating with said structure to indicate said selective depths of rainfall.

3. The invention of claim 1, said releasable structure comprising a slotted bolt straddling said lever, said cup being secured to said bolt, and there being nut means threaded on said bolt below the lever to secure the same to said lever.

4. A rainfall actuated switching apparatus comprising:
a bracket;
a lever;
means pivotally mounting said lever on said bracket for swinging of the lever through a vertical plane;
a cup;
structure securing said cup to the lever with the open end of the cup normally disposed upwardly;
weight responsive biasing means operably coupled between said lever and said bracket to normally yieldably dispose the cup in an upper operating position; and a switch positioned adjacent said lever and actuated thereby when the lever and cup are pivoted against the resistance of said balancing element from the cup's upper operating position to a predetermined lower operating position in response to the weight of rain falling into said cup.

5. The invention of claim 4, said lever being pivoted intermediate its ends to present opposed first and second portions, said cup being secured to said first portion and said biasing means being coupled to said second portion.

6. The invention of claim 5, said bracket having a lateral projection above said mounting means, said switch including a push button depending from said projection and yieldably biased downwardly by said biasing means, the lower extremity of said button engaging the upper surface of said second portion of the lever, whereby said button is depressed upon upward swinging of the second portion of said lever in response to rainfall.

References Cited by the Examiner

UNITED STATES PATENTS 2,843,693    7/1958    Scriver _____ 200—61.04 X

BERNARD A. GILHEANY, *Primary Examiner.*

R. N. ENVALL, JR., *Assistant Examiner.*